United States Patent [19]

Adey

[11] Patent Number: 5,097,795

[45] Date of Patent: * Mar. 24, 1992

[54] WATER PURIFICATION SYSTEM AND APPARATUS

[75] Inventor: Walter H. Adey, Washington, D.C.

[73] Assignee: Ecological Systems Technology, L.P., Washington, D.C.

[*] Notice: The portion of the term of this patent subsequent to Oct. 30, 2007 has been disclaimed.

[21] Appl. No.: 477,439

[22] Filed: Feb. 2, 1990

Related U.S. Application Data

[63] Continuation-in-part of Ser. No. 228,114, Aug. 4, 1988, Pat. No. 4,966,096.

[51] Int. Cl.⁵ .............................................. A01K 63/04
[52] U.S. Cl. ...................................... 119/3; 210/169; 119/5
[58] Field of Search ............... 119/3, 5; 210/169, 602, 210/615, 619

[56] References Cited

U.S. PATENT DOCUMENTS

| | | | |
|---|---|---|---|
| 2,867,945 | 1/1959 | Gotaas et al. | 47/1.4 |
| 3,025,831 | 3/1962 | Berardi | 119/2 |
| 3,155,609 | 11/1964 | Pampel . | |
| 3,198,171 | 8/1965 | Westphale . | |
| 3,232,271 | 2/1966 | Dosamantes De Jose et al. | 119/5 |
| 3,385,786 | 5/1968 | Klock | 47/1.4 |
| 3,387,587 | 6/1968 | Kelley et al. | 119/2 |
| 3,431,200 | 3/1969 | Davis et al. | 47/1.4 X |
| 3,462,360 | 8/1969 | McKinney | 47/1.4 X |
| 3,521,400 | 7/1970 | Ort | 47/1.4 |
| 3,557,753 | 1/1971 | Dantoni | 119/2 |
| 3,565,797 | 2/1971 | Gresham | 210/602 |
| 3,598,726 | 8/1971 | Welch | 47/1.4 |

(List continued on next page.)

FOREIGN PATENT DOCUMENTS

| | | | |
|---|---|---|---|
| 1008191 | 4/1977 | Canada | 210/619 |
| 624588 | 7/1978 | U.S.S.R. | 119/3 |

OTHER PUBLICATIONS

"The Coral Reef: Researching a Living System"; by the National Museum of Natural History, Smithsonian Institution.

"A Living Coral Reef Aquarium" by John Hackney, Sea Scope, Winter, 1985, pp. 3-4.

"And Live from the East Coast—a Miniature Maine Ecosystem" BioScience, vol. 35, No. 10, Nov. 1985.

Adey, "The Microcosm: A New Tool for Reef Research," Coral Reefs, 1983.

Primary Examiner—Robert P. Swiatek
Attorney, Agent, or Firm—Dickstein, Shapiro & Morin

[57] ABSTRACT

A water purification system creates an integrated, small-scale marine or fresh water ecosystem that is particularly useful as a home, school, office, or laboratory aquarium. In operation, water from the aquarium tank is routed to an algal turf scrubber screen or equivalent algal-growing surface placed in a movable, tray-shaped receptacle. An algal turf, comprising preferably a dense colony of microalgae, resides on the screen. As the receptacle fills with water, the center of gravity of the receptacle moves across the axis of the pivots upon which the receptacle is mounted. At this time, the substantially filled receptacle rotates on its pivots and the desired surge effect across the scrubber by the exiting water is achieved. The surge, light energy provided by lights above the receptacle, and algal photosynthesis promote metabolic cellular-ambient water exchange to remove carbon dioxide, dissolved nutrients and organic compounds, and other pollutants. Oxygen is also released into the water. The substantially emptied receptacle returns to its horizontal position and the purified and oxygenated water is then returned to the tank. A linear or rotary vibrating motor may also periodically cause water to surge across the screen. In addition, other appropriate components of the ecosystems may be included, such as tide creators, high intensity, broad spectrum artificial lights over the tank, salinity controllers, pH controllers, sediment removers, temperature controllers, automatic feeders, timers, and the like.

43 Claims, 5 Drawing Sheets

U.S. PATENT DOCUMENTS

| | | | |
|---|---|---|---|
| 3,661,262 | 5/1972 | Sanders | 210/169 |
| 3,760,767 | 9/1973 | Hickey | 119/3 |
| 3,763,824 | 10/1973 | Schoon | 119/4 |
| 3,839,198 | 10/1974 | Shelef | 47/1.4 X |
| 3,848,567 | 11/1974 | Garber, Jr. | 119/5 |
| 3,889,418 | 6/1975 | Porter et al. | 47/1.4 X |
| 3,929,101 | 12/1975 | Katz | 119/5 |
| 3,955,318 | 5/1976 | Hulls | 47/1.4 |
| 3,957,017 | 5/1976 | Carmignani et al. | 119/3 |
| 3,973,519 | 8/1976 | McCarty et al. | 119/3 |
| 4,005,546 | 2/1977 | Oswald | 47/1.4 |
| 4,076,619 | 2/1978 | Howery | 119/5 X |
| 4,213,421 | 7/1980 | Droese et al. | 119/3 |
| 4,267,038 | 5/1981 | Thompson | 210/602 |
| 4,324,200 | 4/1982 | Johnson | 119/2 |
| 4,333,263 | 6/1982 | Adey | 47/1.4 |
| 4,769,138 | 9/1988 | Frandsen | 210/619 X |
| 4,966,096 | 10/1990 | Adey | 119/3 |

WATER PURIFICATION SYSTEM AND APPARATUS

CROSS-REFERENCE TO RELATED APPLICATION

This application is a continuation-in-part of applicant's copending application Ser. No. 07/228,114, filed Aug. 4, 1988, now U.S. Pat. No. 4,966,096, which is incorporated herein by reference.

BACKGROUND OF THE INVENTION

This invention relates generally to water quality control and purification systems and in particular to a water purification system and apparatus that creates an integrated, small-scale marine or aquatic ecosystem particularly useful as a home, school, office, or laboratory aquarium.

For centuries, man has attempted to re-create a small portion of the underwater environment, but this has proven to be an especially difficult task, particularly for a salt water environment The difficulties of keeping marine life alive in captivity have been described as "witchcraft mixed with a little science."

Since fresh water organisms are more adapted to a changeable environment, generally past experience with fresh water culture has been more successful than with sea water, though not without considerable difficulties.

In the past, the problem has been said to be instability of water (particularly sea water) and its organic constituents, when confined in an aquarium or circulatory systems, and the characteristic inability of marine and to lesser extent aquatic organisms to adjust to changes in their environment. The necessary components of a proper environment were thought to include a chemically inert water system, a low ratio of animal life to volume of water, the control of bacteria, and the elimination of metabolic waste products.

In addition, since an aquarium contains a fixed volume of water, which is used repeatedly, its ecology is fragile and dependent upon many interrelated physical, chemical, and biological factors. These include the oxygen-carbon dioxide cycles, the nitrogen and phosphorus cycles, and the balance of particulate matter. With respect to the latter, soluble and insoluble organic and inorganic waste materials, which are excreted by aquatic specimens or which are formed by the natural decomposition by bacteria of plant and animal tissues, must be removed from the aquarium environment. This particulate matter, along with dissolved organic compounds, is converted by bacterial action to carbon dioxide and dissolved nutrients. The concentration of such metabolites in a fixed volume of water must be kept carefully balanced so that the system does not become overloaded, particularly by ammonia, carbon dioxide and nutrients, and at the same time depleted of oxygen.

In order to capture a complex aquatic environment in an aquarium, particularly a saltwater environment in a small home, school, office, or laboratory aquarium, it is necessary to simulate the natural environment. All of the physical and chemical components of the environment must be provided. Then the balance of plant and animal life and their proper relation to the volume of water must be adjusted. Previous attempts to do so on the scale of a home aquarium have not given sufficiently satisfactory results.

Traditional home aquaria have re-created only a limited part of the natural environment. Water quality is maintained by mechanical filters that remove sediment, by biological (bacteriological) filters that break down the first product of animal excretion, ammonia, and by systems for bubbling air through the water in order to add oxygen. Lighting is generally kept at a minimum in order to avoid algal blooms due to inherently high nutrient levels.

This traditional system has numerous inadequacies. Although biological filters remove particulate organic matter and ammonia, they can leave the system high in reactive nutrients. In addition, they consume oxygen and produce carbon dioxide. The latter compound has the undesirable effect of lowering the pH of the water, i.e., making the water more acidic. The filters used for organic sediment control can filter out plankton, whose presence is desirable in marine and aquatic ecosystems. Simple on/off lighting does not adequately simulate dawn and dusk, the time of greatest stress in the ecosystem. Finally, the low level of light does not add sufficient energy to support a complete and complex ecosystem. In sum, these systems are inherently unstable, and the organisms in them are prone to poor health and disease. Therefore, even the successful masters of the "witchcraft" of aquarium management have been limited to keeping only selected fish and a few invertebrates.

Several attempts have been made to improve upon conventional mechanical and bacteriological filtration of water by adding other filtration systems to the aquarium. See, for example, U.S. Pat. Nos. 3,929,101 to Katz, 3,848,567 to Garber, and 3,557,753 to Dantoni, which combine an algal filtration system with the standard bacteriological filter. Another approach has been to add biochemical filtration to the standard bacteriological filter in order to control pH. See U.S. Pat. No. 3,387,587 to Kelley. These approaches address one of the many components of an aquatic ecosystem, but they are a long way from duplicating such an ecosystem in a home aquarium.

A more system-oriented approach to water purification is disclosed in U.S. Pat. No. 3,155,609 to Pampel. This patent discloses a complex system of plumbing and chambers for directing water turbulence, calcium treatment, and a variety of limited band light treatments to purify eutrophic water from a biological source of pollution. The light treatments are regarded as having a variety of photochemical effects, and photosynthesis is used in one section of the system. Although the inventor asserted a microcosm-like control of a closed water system, there is no effort to use natural energy sources relative to real ecosystems. Also, there is no effort directed toward optimizing photosynthetic efficiency. Moreover, the purifying unit is separate from the biological unit being purified. Thus, the Pampel system is not an integrated system that could serve as a marine or aquatic ecosystem, particularly on a small scale.

Newer methods of water quality control utilize bacterial conversion of nitrogen to the gaseous form (denitrification). However, this is a process of low efficiency, and it does not handle phosphorus or lower carbon dioxide.

A major step forward in water purification and aquatic-marine ecosystem simulation was made with the invention of the algal turf scrubber. The scrubber is described in U.S. Pat. No. 4,333,263 to Adey, which is incorporated herein by reference. This process provided the relatively high efficiency of photosynthesis for water purification in controllable form in the marine or aquatic environment. That algal turf scrubber utilizes dense mats of benthic microalgae which are subjected to light and water surge motion created by a wave generator to promote metabolic cellular-ambient water exchange as a means of removing carbon dioxide, dissolved nutrients and organic compounds, and a variety of pollutants from natural or waste water. The algal turf scrubber also injects oxygen into the aqueous environment. An important aspect of that invention is the use and optimization of wave surge motion to enhance the exchange of metabolites between the algal cells and the water media. By optimizing the surge motion and by continuously harvesting the algae in a young, rapidly growing state, the photosynthetic efficiency of the algae is enhanced and optimized.

Such an algal turf scrubber has been used in a large, man-made marine ecosystem. See W. H. Adey, "The Microcosm: A New Tool For Research," in *Coral Reefs* (Springer-Verlag 1983), pgs. 193-201, which is incorporated herein by reference. It allowed the recreation of a marine ecosystem on a large scale (1800 gallons) for the first time. No bacteriological filtration, chemical conditioning, or air bubbling was needed. The use of the algal turf scrubber also permitted the use of appropriately intense lighting, equivalent to sunlight, thereby providing sufficient naturally-derived energy for the maintenance of a complex ecosystem containing numerous and diverse living organisms.

However, until the present invention, it was not possible to operate such a complete ecosystem on a small scale, such as in a home, school, office, or laboratory aquarium involving approximately 40-150 gallons of water. The necessary efficiency could not be achieved on such a compact scale.

Another inadequacy of the traditional system for home aquaria is the inability to simulate tidal displacement. In natural systems, tide will change the level of the water surface in a cyclical period. The cycle includes a daily cycle as well as a monthly cycle. For example, the tides at "spring" levels corresponding to sun and moon together having maximum effect have a higher amplitude of difference between the high tide and the low tide as compared to other times of the month. Thus, there is a need for a simple yet effective means to raise and lower the water surface in the aquaria on both a daily basis and a bi-weekly basis.

SUMMARY OF THE INVENTION

The present invention provides a closed, small-scale marine or fresh water ecosystem that is particularly useful as a home, school, office, or laboratory aquarium In a preferred embodiment, it contains an aquarium tank, an improved algal turf scrubber, lighting systems for the scrubber and the aquarium tank, a pumping system for bringing water from the tank to the scrubber, and a fluid level controller for simulating tides. The improved algal turf scrubber combines the previously separated functions of water surge generation and algal turf scrubbing. The surge (i.e., oscillatory water motion) is generated by and within the turf scrubber rather than external to it. Thus, the present invention provides, in a minimum acceptable space, the environmental factors required for aquatic and marine ecosystems, including filtration, nutrient, salinity and evaporation, pH, and temperature control, adequate light of appropriate spectrum and intensity, current and surge without killing desirable plankton, a tide-creating mechanism, and a feeding mechanism.

In the operation of the preferred embodiment, water from the aquarium tank is routed to an algal turf scrubber comprising a screen placed in a moveable, substantially horizontally positioned, tray-shaped receptacle pivotally attached to a support structure. A colony of microalgae or smaller macroalgae resides on and is attached to the screen. Artificial lights are positioned above the screen. As the receptacle fills with water, the center of gravity of the receptacle moves across the axis of the pivots upon which the receptacle is mounted. At this time, the substantially filled receptacle rotates on its pivots and the desired water turbulence, in particular a surge effect, across the surface of the scrubber is achieved by the exiting water and the recovery of the receptacle. The water is returned to the tank, and the substantially emptied receptacle returns by gravity to its horizontal position. The continual, periodic filling and dumping of the receptacle creates a periodic surge of water across the algae. The surge, artificial lights, and algae promote metabolic cellular-ambient water exchange for removing carbon dioxide, dissolved nutrients and organic compounds, and pollutants from the water in a highly efficient manner. Oxygen is also released into the water. The growing algal turf is periodically harvested before being overgrown by macroalgae.

In an alternative embodiment, the algal turf scrubber comprises an algal turf on a different moveable surface. The movement of the scrubber is caused by a motor or similar moving means, which creates a surge of water across the algal turf when it is in contact with water In yet another alternative embodiment a rotary vibratory motor moves the surface through the water in a periodic, oscillating manner to create a surge across the algal turf. The scrubber may be positioned in the water in the aquarium tank, or water from the tank may be brought to and recovered from the scrubber.

The present invention also provides an apparatus and a method, particularly suited for efficient operation on a small scale, for removing a wide variety of organic and inorganic pollutants from water. Contaminated or polluted water is pumped from a storage facility to the improved algal turf scrubber previously described and then returned to the storage facility. After a sufficient number of cycles, the photosynthetic activity of the scrubber results in the conversion of all or substantially all of the dissolved nutrients and other pollutants to biomass. The purified water is then pumped to another storage facility.

The present invention also provides a tidal level controller, particularly suited for efficient operation on a small scale for raising and lowering the surface of the water within the tank on both a daily basis and a seasonal basis A flexible tube is cyclically raised and lowered within the tank to siphon off water to a tidal reservoir. The water is returned from the tidal reservoir to the tank through the apparatus discussed above. A rotating arm rotated by a timer raises and lowers the intake end of the flexible tube. This cycle can be set by the operator to correspond to the daily tidal rise and fall as well as a seasonal tidal rise and fall.

Accordingly, it is an object of the present invention to provide a closed, small-scale marine or fresh water ecosystem that is particularly useful as a home aquarium.

Another object of the present invention is to provide an improved algal turf scrubber.

Another object is to provide a method for removing nutrients and waste from water and adding oxygen to the water.

Another object of the invention is to provide an apparatus for purifying water.

Another object of the invention is to provide a tidal level controller.

Other objects and advantages of the present invention will be readily apparent from the following description and the accompanying drawings. The drawings, which are incorporated in and constitute a part of this specification, illustrate the preferred embodiment of the invention.

DESCRIPTION OF THE PREFERRED EMBODIMENT

Figure 1:
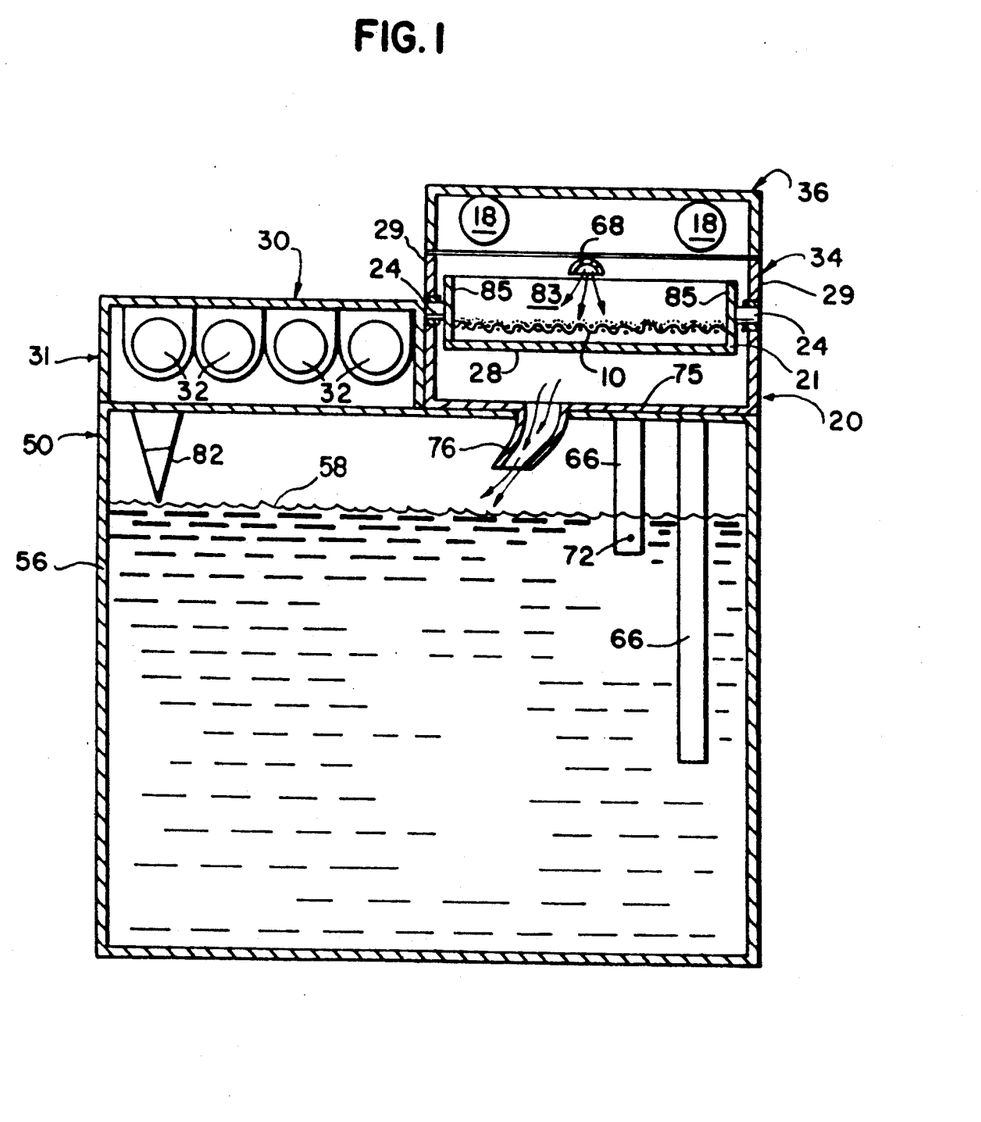
FIG. 1 is a partial cross sectional elevational view of the aquarium and algal turf scrubber according to the present invention.

Referring to FIG. 1, there is shown a cross sectional elevational drawing of an aquarium 50 according to the preferred embodiment of the present invention. The preferred embodiment employs a 120 gallon aquarium tank 56, but the system may be scaled up or down to accommodate different size tanks or other bodies of water to be cleaned, such as 70 gallon tanks and 40 gallon tanks.

The tank top unit, referred to generally by reference numeral 30, includes the tank lighting compartment referred to generally as reference numeral 31, the control unit referred to generally by reference numeral 34 and the cover to the control unit 34 referred to generally by reference numeral 36. Artificial tank lights 32 are housed within the compartment 31 and the artificial scrubber lights 18 are housed within the cover 36. The algal turf scrubber referred to generally as reference numeral 20 is housed within the control unit 34. A moveable, substantially horizontal, tray-shaped receptacle 21 pivots upon pivots 24, which are attached to and supported by the structure of side walls 29 of scrubber 20.

Water falling from the first conduit 68 falls unto the algal turf scrubber screen 10, which rests on or is attached to the upper surface of the bottom 28 of the receptacle 21. When the receptacle 21 pivots and water falls off the screen 10, as described more fully below and shown in FIGS. 3 and 4, the water falls unto the bottom inclined surface 75 of the scrubber 20 and is returned to the tank 56 through the second conduit 76, thereby creating a wave or surge in the tank 56.

Figure 2:
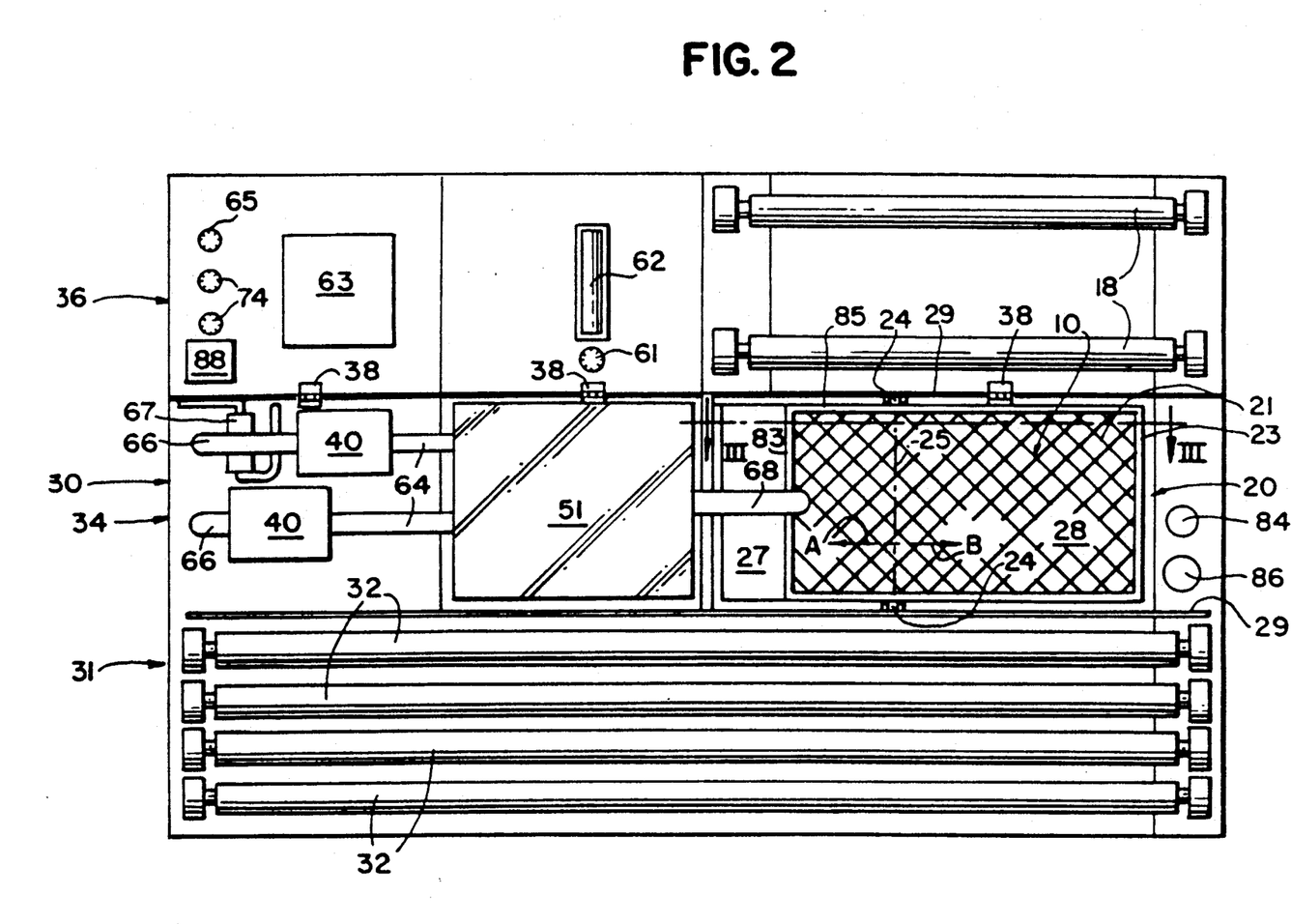
FIG. 2 is a plan view of the tank top unit of the aquarium of FIG. 1 with the cover opened

Referring to FIG. 2, there is shown a plan view of the preferred embodiment of a tank top unit, generally designated by reference numeral 30, for creating a closed, small-scaled marine or fresh water ecosystem particularly useful as a home, school, office, or laboratory aquarium according to the present invention. The tank lighting compartment 31 of FIG. 2, roughly equaling the bottom third section, is the tank lighting section of the tank top unit. The middle section of the tank top unit 30, consisting of approximately the middle third as shown in FIG. 2, is the control unit generally designated by reference numeral 34. The control unit includes a pump means 40, a refugium 51, and the algal turf scrubber 20. Finally, the upper third portion of tank top unit 30 as shown in FIG. 2 is the cover of the control unit, generally designated by reference numeral 36. The cover 36 contains lights 18 for the scrubber, a quartz light 62 for the refugium 51, the timers 65 and 74, a level controller 63, and internal wiring 88. Timer 65 controls the scrubber lights 18, and timers 74 control the tank lights 32.

In the preferred embodiment, very high output fluorescent lights 32 are housed within tank lighting compartments 31. Timers 65 turn on and off lights 32 in a sequence such that the change from full dark to full brightness and vice-versa is gradual so as to simulate dawn and dusk respectively, these being the times of greatest stress in the ecosystem. The length of time the tank lights 32 are on will depend upon the actual ecosystem being simulated. With a coral reef system, for example, the lights will be on 12-14 hours In the preferred embodiment, cooling holes on the upper surface of tank lighting compartment 31 are used to dissipate the heat from the lights 32, but other suitable methods of cooling, such as fans, may be used.

Water to be cleaned is taken from the aquarium tank 56 (FIG. 1) into the tank top unit 30 through the third conduits 66 by pump means 40 as shown in FIG. 2. Two third conduits 66 are used in the preferred embodiment. As shown in FIG. 1, one extends just below the surface of the water 58 in tank 56 and the other extends well below the surface of the water 58 of the tank 56. The suction from two separate points in the tank 56 minimizes the occurrence of any stagnant areas in the tank. A hole 72 disposed in one of the third conduits 66 just below surface 58 assures that, should water escape from the system through, for example, a leak that continued escape will not continue because, as the level 58 drops below hole 72 air will enter third conduit 66 rather than water and thus the leaking will stop. The pump 40 provides the suction needed to bring the water up from the aquarium tank 56. Pump 40 may be a lift, bellows, Archimedes screw, or any other suitable pump which will not destroy the plankton or other organisms in the water in large numbers. In the preferred embodiment, two pumps 40 are used in parallel, each connected to a separate third conduit 66 to assure back-up if one pump 40 fails.

The water exits the pumps 40 through the two fourth conduits 64, which force the water under pressure into the refugium 51. The refugium 51 acts as a safe haven from predation for the smaller organisms in the ecosystem such as insect larvae, smaller invertebrates, etc. The refugium 51 is sealed with a clear plastic cover on its upward surface to permit observation of the organisms within the refugium 51 The refugium 51 is sealed airtight so that the pressure from the pumps 40 is transmitted through fourth conduits 64 into the refugium 51 and ultimately forces water through first conduit 68, as described more fully below. The water then passes through the third conduit 68 by the pressure force of pumps 40 into the algal turf scrubber 20.

The refugium 51 may be removed to permit cleaning or observation away from the tank top unit 30. When the refugium 51 is removed, a "Y" shaped hose may be connected to fourth conduits 64 and first conduit 68 in order to maintain the flow of water. The refugium 51 need not be connected in series with the scrubber 20 as in the preferred embodiment and may constitute an entirely different system separate from the scrubber altogether.

Figure 3:
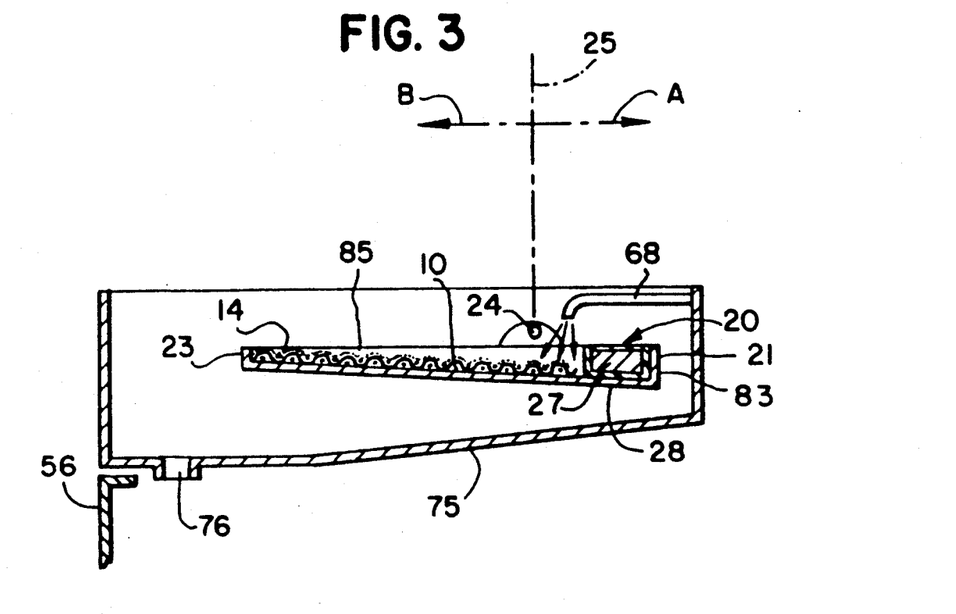
FIG. 3 is a view taken along section line III—III of FIG. 2 showing the moveable, substantially horizontal, tray-shaped receptacle for holding the microalgae.
Figure 4:
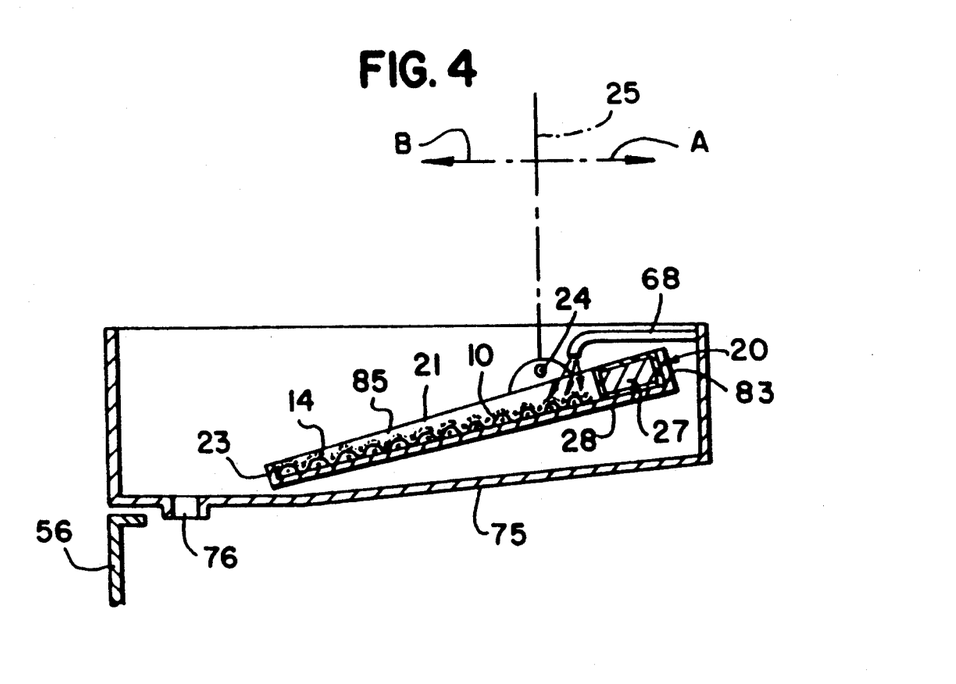
FIG. 4 is a view like FIG. 3 showing the receptacle in its "tipped" position.

As shown in FIG. 2, the algal turf scrubber screen 10 is positioned to cover substantially the entire bottom surface 28 of the moveable, tray-shaped receptacle 21. Receptacle 21, as shown in FIGS. 3 and 4, comprises a substantially flat rectangular shaped bottom 28 with a back wall 83 perpendicular to the bottom 28 and a front wall or lip 23 also perpendicular to bottom 28 and substantially shorter than back wall 83 and two side walls 85 also perpendicular to bottom 28 and trapezoidally shaped. Thus, the water exiting from the first conduit 68 into the receptacle 21 flows over the algal turf scrubber screen 10. Screen 10 is suitably pitched with hole size and wire size dimensioned for growing microalgae, such as 0.5–5 mm mesh. The preferred embodiment uses a removable screen 10, but a suitably-grooved plastic surface, or other suitable algae-growing surfaces may also be used. Such surfaces include cotton gauze, spun glass, or similar materials.

In an alternative embodiment, the bottom surface 28 of the tray-shaped receptable 21 may be used as the growing surface for the algae. In such cases, it is generally preferred that surface 28 be grooved or otherwise modified so that the microalgae may better attach to such surface.

An algal turf 14 resides on screen 10. As used herein, the term "algal turf" and its derivatives refers to a colony of attached microalgae and/or smaller macroalgae and/or spores of the microalgae or smaller macroalgae. The term "microalgae" refers to algae that are smaller than approximately 2 centimeters in height or length. Examples of such algae may be found in U.S. Pat. No. 4,333,263 to Adey, previously incorporated by reference. The term "smaller macroalgae" refers to algae that are smaller than approximately 20 centimeters in height or length. Examples of such algae include Gracilaria (a red algae), Enteromorpha (a green algae), and Dictyota (a brown algae) Benthic microalgae or a colony dominated by such algae are preferred. In certain ecosystems, however, a colony in which a significant percentage or even the majority of the algae are smaller macroalgae may be preferable. Generally, care must be taken to prevent the macroalgae from overgrowing the turf or the scrubbing efficiency of the system will decrease significantly.

In the beginning of the operation of the aquarium, it is generally more convenient to attach spores of the desired microalgae or smaller macroalgae to screen 10. Such spores, after being in contact with tank water and light, grow to provide the algal turf attached to the screen.

Also in operation, other types of small organisms, such as micrograzers, may be present on the screen or elsewhere in the tray-shaped receptacle 21. However, as long as the algae and preferably the microalgae continue to dominate the complex community, the scrubbing efficiency of the algae turf scrubber will be substantially maintained.

A portion of the microalgae on the screen 10 may be periodically removed by scraping the screen 10 to prevent the screen 10 from becoming overgrown with macroalgae. After scraping, some of the microalgae continues to reside on the screen 10 so as to start new growth of algae. Micrograzers, small organisms that consume the algae, are also removed by the scraping, thus assuring that the micrograzers do not come to dominate the algae system and thereby reduce efficiencies.

As the water fills up the receptacle 21, it falls unto the screen 10 which is attached to or otherwise positioned on the upper side of surface 28 of the receptacle 21. The screen 10 may be positioned above the upper side of surface 28 of the receptacle 21 or upon any other suitable surface to promote metabolic cellular-ambient water exchange for purification of the water as described more fully below.

As shown in FIG. 2, receptacle 21 is mounted to walls 29 on pivots 24. The axis 25 of pivots 24 is designated by reference numeral 25 in FIGS. 2, 3 and 4. Receptacle 21 is shaped such that, when emptied of water, the center of gravity of receptacle 21 is positioned on the side of axis 25, designated as side A in FIGS. 2, 3 and 4. In the preferred embodiment, a lead counter weight 27 is positioned on the side A of receptacle 21. Weight 27 is completely encased in plastic to avoid contamination to the system. As the receptacle 21 fills with water, the center of gravity of the receptacle 21 shifts from side A of the axis 25 to side B of the axis 25. A low friction and corrosion-free material such as teflon or the like, is used for the pivots 24.

FIG. 3 shows the receptacle 21 in its filling position. Because the receptacle 21 is not substantially full of water in FIG. 3, the center of gravity resides on the A side of axis 25 and the receptacle 21 is not pivoted with respect to pivots 24.

FIG. 4 shows the receptacle 21 in its draining position. The center of gravity has moved from the A side of axis 25 to the B side of axis 25 and, accordingly, the receptacle 21 is pivoted with respect to pivots 24. Water flows downward off the algal turf scrubber screen 10 and algal turf 14 and over the lip 23 of the receptacle 21. The water is caught by the bottom surface 75 of the scrubber 20 and exits through the second conduit 76 back to the tank 56. Thus, the tipping and recovery of receptacle 21 generates a surge of water across the algal turf 14 promoting metabolic cellular-ambient water exchange for scrubbing the water.

Water exiting through the second conduit 76 falls onto the upper surface 58 of the water in tank 56. The periodic falling of water into the tank 56 causes a surge in tank 56, which simulates waves and surges such as those present in lakes and oceans. Such action helps distribute the scrubbed (cleaned and oxygenated) water in tank 56. Second conduit 76 may be shaped, for example, concaved, to target a surge of scrubbed water back into a particular area of the tank 56, if desired for practical or aesthetic reasons. For example, second conduit 76 may be a nozzle or spout pointed at the forereef of a reef, or if no surge is desired, second conduit 76 may be formed as a long slot thereby reducing the surge effect of the scrubbed water entering the tank 56.

In FIG. 2, the cover 36 of the control unit 34 is shown as opened upon its hinges 38. Artificial lights 18 are positioned above the scrubber 20. The artificial lights 18 provide light of sufficiently wide spectrum and intensity so as to match substantially the sunlight in the particular natural ecosystem sought to be created in the small-scale aquarium. Such ecosystems include a coral reef, a marine estuary, a tropical rain forest river, and a fresh water lake. The lights should deliver substantially all of the wave lengths of natural light at an output of about 50% to 110% of natural light. Very high output fluorescent lights are preferred, although in some case metal halide lamps may be used. Such lamps are chosen in order to provide light energy in the range of approximately 300 uE/m$^2$/sec to 1200 uE/m$^2$/sec to simulate the solar energy available in the wild environment. In the preferred embodiment, photosynthetic efficiencies of 2% to 6% may be achieved. (As used herein, the term "photosynthetic efficiency" and derivatives thereof is intended to refer to the conversion of light energy as measured in microeinsteins to algal biomass, the energy of the biomass being measured by means known in the art by placing the algae produced by the operation of the scrubber into a calorimeter, burning the algae to convert it to heat, and measuring the heat. The artificial lights 18 are preferably operated at night; i.e., primarily when the tank lights are off. Twelve to fourteen hours are generally preferred, with the time being determined and adjusted by the amount of algae being produced and the demands on the ecosystem. In the preferred embodiment, cooling holes on the upper surface of cover 36 are used to dissipate the heat from the lights 18, but other suitable means of cooling, such as fans, may be used.

Also shown in FIG. 2, quartz or halide lamp 62 may be positioned on the cover 36 so as to reside above the refugium 51 when the cover 36 is closed. The lamp 62 provides necessary lighting to the organisms in the refugium 51 and is controlled by timer 61.

Figure 5:
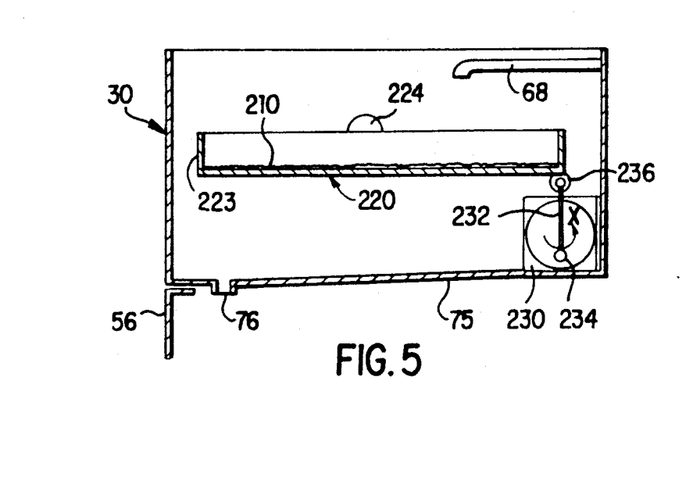
FIG. 5 is a cross sectional view of an alternative embodiment of the algal turf scrubber of the present invention.
Figure 6:
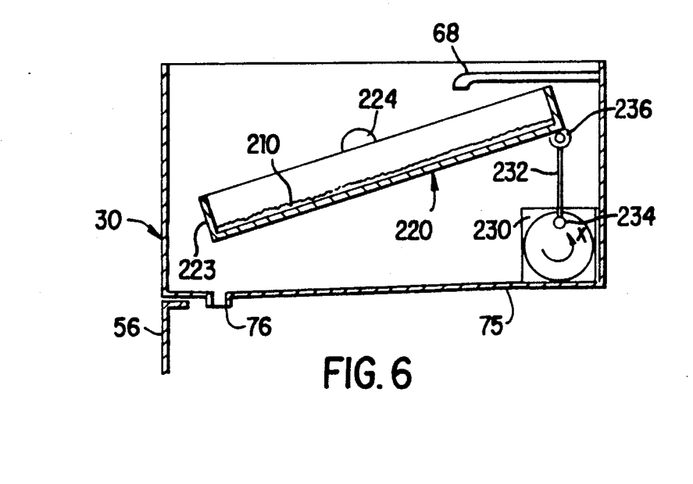
FIG. 6 is another cross sectional view of the scrubber of FIG. 5 being moved by a motor means.

Refer now to FIGS. 5 and 6 wherein is shown a cross sectional view of an alternate embodiment of the algal turf scrubber generally designated by the reference numeral 220. As shown in FIG. 5, the scrubber 220 has a turf scrubber screen 210 positioned on its upper inside surface. It has a front lip 223 and a central pivot 224. The first conduit 68 is positioned above the scrubber 220 and water from the conduit 68 may fall onto the scrubber 220. The alternate embodiment also includes a rotary motor 230 with a face that periodically rotates in the direction X shown in FIGS. 5 and 6. The rotating face has a linkage 234 which connects the face to the scrubber 220 by a linkage 236. The linkages 234 and 236 are connected by a rigid arm 232 which is pivotally connected to the linkages 234 and 236. As shown in FIG. 5 when the pivot 234 is at its lowest position in the rotation of X the scrubber 220 is substantially horizontal. As the face of the motor 230 rotates in the direction X as shown in FIG. 6, the linkage 234 moves upward and this upward movement is translated to the linkage 236 by the arm 232. Thus, the scrubber 220 pivots around the pivot 224 and fluid on the screen 220 runs off and over the lip 223. This fluid returns to the tank 56 by the second conduit 76. Thus, FIGS. 5 and 6 show the moving surface housing the scrubber screen 210 being moved by motor means rather than the gravitational means discussed with regard to the earlier embodiment.

Figure 7:
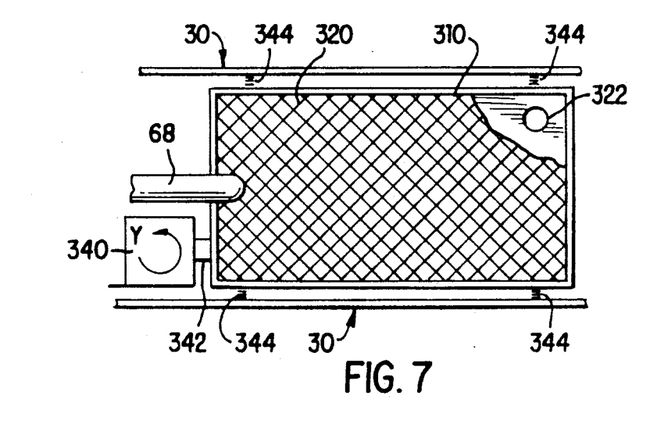
FIG. 7 is a partial cut away plan view of another alternative embodiment of the scrubber of the present invention using a rotary vibratory motor.

FIG. 7 shows yet another alternate embodiment of the scrubber generally designated as 320 in FIG. 7. FIG. 7 is a plan view with a partial cutaway of the algal screen 310. As shown in FIG. 7, the scrubber 320 is positioned within the tank top unit 30. The scrubber 320 is positioned so that fluid from the first conduit 68 may fall onto the screen 310. The screen 310 is substantially horizontal within the scrubber 320. A rotary vibration motor 340 is also positioned within the top tank unit 30 and is securely fixed to the scrubber 320 by arm 342. As shown in FIG. 7, the vibration motor vibrates in a generally periodic, circular manner in the plane of the screen 310 as shown by the arrow Y. This vibration is translated to the scrubber 320 by the arm 342 so that the scrubber 320 also vibrates in a generally rotary manner. The scrubber 320 is mounted to the top tank unit 30 by coils 344 so that the scrubber 320 may be free to vibrate in an oscillatory manner. This vibration causes an oscillatory, surging of the algae contained on the screen 310 through the water in the scrubber 320. An exit hole 322 is positioned upon the bottom of the scrubber 320 so that fluid may exit and eventually return to the tank 56 by the second conduit 76.

Figure 8:
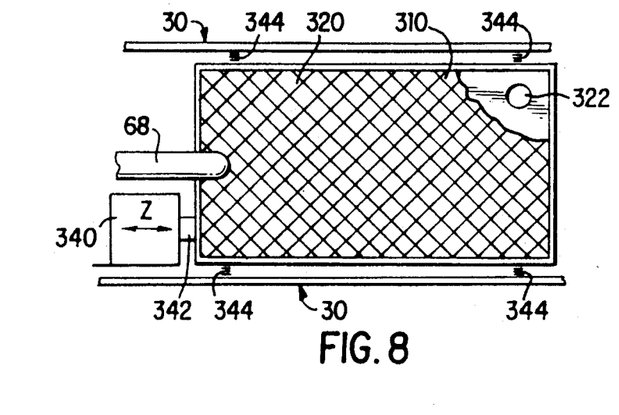
FIG. 8 is a partial cut away plan view of another alternate embodiment of the scrubber of the present invention using a vibratory motor which vibrates linearly back and forth.

In an alternative embodiment, the vibration motor 340 may also vibrate periodically, back and forth in a single direction such as along the axis of the arm 342 shown as arrow Z in FIG. 8. Thus, the scrubber 320 is moved from side-to-side rather than in a rotary, oscillatory manner. This causes a side-to-side motion substantially within the plane of the screen 310. This side-to-side motion causes a surging of the algal contained on the screen 310 through the water in the scrubber 320.

Thus, in the operation of the preferred embodiment, the water from the tank 56 is brought by lift pumps 40 to the algal turf scrubber 20 where it is subjected to an algal turf 14 which resides on the screen 10, light from the artificial lights 18, and the periodic surge motion caused by the tipping and recovery of the receptacle 21. This promotes metabolic cellular-ambient water exchange for removing carbon dioxide, dissolved nutrients and organic compounds, and a variety of pollutants from the water. The algae on screen 10 also release oxygen into the water. The conduits 68, 76, 66, and 64, the pumps 40, refugium 51, scrubber 20, and receptacle 21 are designed and dimensioned such that the volume of flow and the period of the tipping is sufficient to provide adequate purification of the water. For example, the system may be designed and dimensioned to tip the receptacle 21 every five to thirty seconds. Preferably, the receptable 21 is tipped every 5 to 15 seconds and most preferably approximately every 10 seconds. In the preferred embodiment, pumps 40 pump about 5 gallons per minute, and the screen 10 is 10"×36".

The angle of rotation of receptacle 21 about the axis 25 of pivots 24 ranges from about 15 degrees to about 45 degrees. Preferably, it is about 30 degrees.

In an alternative embodiment having a 70 gallon tank, pumps 40 pump about 3 gallons per minute, the screen 10 is 6"×18" and the period of tipping is about 5 to 15 seconds.

In another alternative embodiment involving a 40 gallon tank, pumps 40 pump about 2 to 3 gallons per minute, the screen 10 is 6"×12" and the period of tipping is 5 to 15 seconds.

Because salinity increases as the volume of water decreases from evaporation, by maintaining a constant volume of water in the tank 56, the preferred embodiment maintains constant salinity in the water. A water level sensor 82 (FIG. 1), which in the preferred embodiment is an infra-red water level sensing device, monitors water level 58. If level 58 falls too low, sensor 82 triggers water top off pump 67 (FIG. 2). The pump 67 draws fresh water from a reservoir.

Where a more acidic environment is required or desired, as in an ecosystem simulating a tropical rain forest river, means for controlling the pH are combined with the salinity control means as follows. Pump 67 draws liquid from two separate reservoirs, one of which contains fresh water, the other of which contains an acid solution. The acid solution contains a 15:1 molar ratio of nitrogen in nitric acid to phosphorus in phosphoric acid. Pump 67 draws from each reservoir at a predetermined ratio so as to maintain the desired pH in the water of tank 56 as well as the desired salinity. A single pump, such as a Master-flex pump, connected by a tube to tank 56 and drawing from both reservoirs through two tubes is used. Because the microalgae use nitrogen and phosphorus at a ratio of 15 to 1 as food, the nitrates and phosphates are converted into biomass, removing them from the ecosystem. In addition, acidity may be controlled by transferring gaseous carbon dioxide into the water in the tank at a predetermined rate. For example, the carbon dioxide could be stored in a pressurized bottle and transferred into the tank by an adjustable valve. Thus, acidity is maintained by natural means without the addition of special chemicals that are left in the water or that must be removed by special means.

Additionally, as also shown in FIG. 2, features well known in the art may be supplied. These include temperature controllers 84, automatic feeders 86, and ballasts for the lights.

Preferably, plastic materials are used for construction to the greatest extent possible to avoid corrosion and contamination of the water by metals.

Although in the preferred embodiment, the surface upon which the algae is grown and the receptacle holding the surface are substantially flat and horizontal, the invention is not limited to this sole structure. In the broadest aspect of the invention, the algal turf is on a surface, preferably a generally planar surface. Such surface may be irregular, although it is most preferably substantially flat. Such surface may be in the form of a receptacle or within a receptacle. Preferably, such receptacle is tray-shaped. Moreover, the surface may be vertical, horizontal, or anything in between. In the preferred embodiment the tray may slant approximately 10° below horizontal away from the side the water is tipped over.

In an alternative embodiment, the claimed invention provides a method and apparatus for purifying or treating water in an efficient manner. It can be used in the treatment of sewage or other forms of water pollution or in the cleaning or purification of well water, tap water, or water in swimming pools. Such apparatus comprises an appropriate support structure, the improved algal turf scrubber of the present invention, the appropriate artificial lights for the scrubber, and pumps and pipes to bring contaminated water to the scrubber receptacle. In operation, the waste water is pumped from a storage tank to the tray-shaped receptacle which, when substantially filled, tips, spilling the water and creating the surge motion that promotes metabolite cellular-ambient water exchange. The water is recycled a sufficient number of times until the desired level of purification is reached. Once a desired level of purification is achieved, the water is released from the storage tank and a new batch of contaminated water is pumped into it so that the process may start again.

Figure 9:
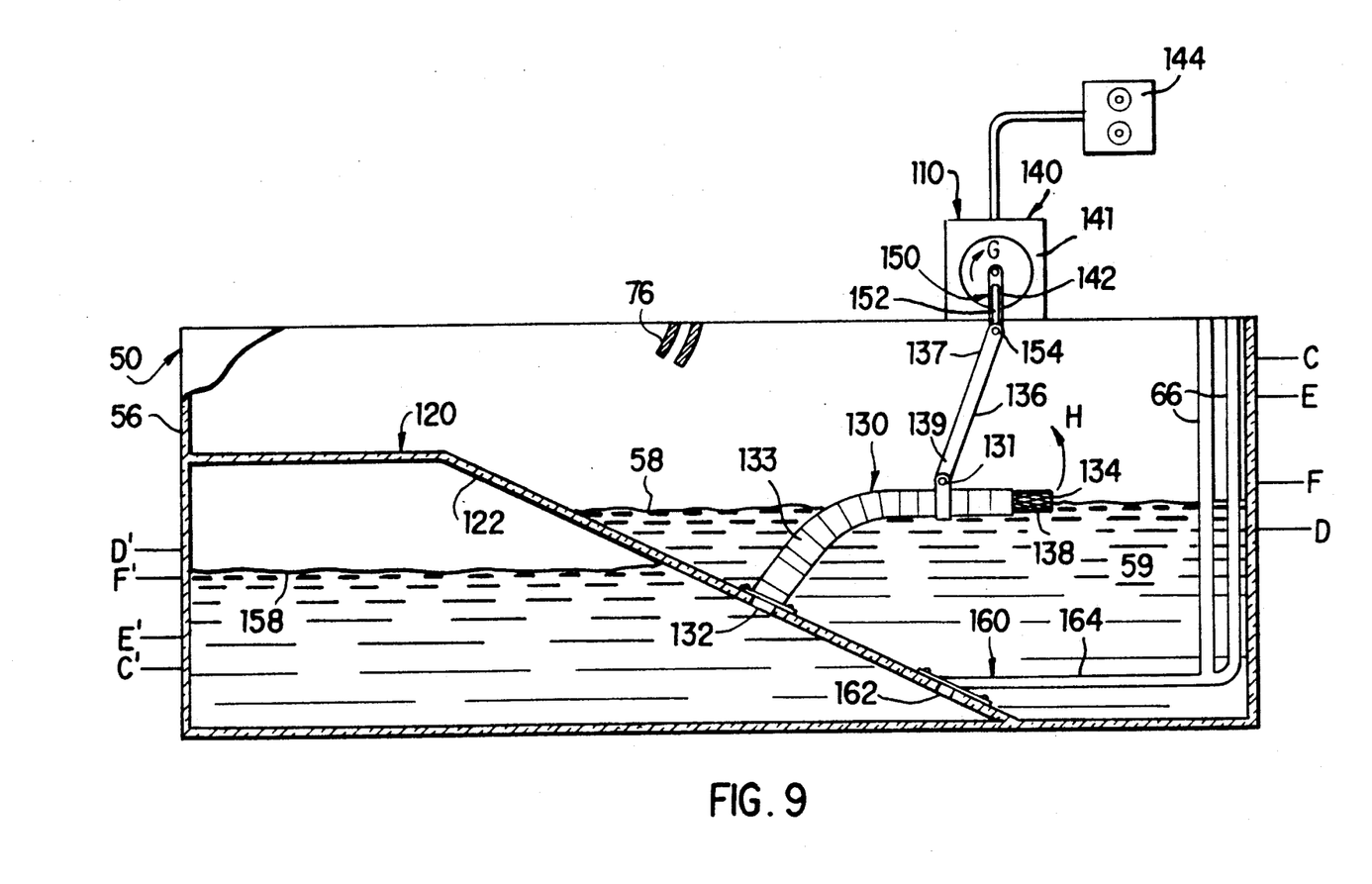
FIG. 9 is a partial cross sectional view of the aquarium and the tidal level controller of the present invention.

Refer now to FIG. 9 wherein is shown an alternate preferred embodiment of an aquarium, with a tidal level controller generally referred to by the reference numeral 110, according to the present invention. The tidal level controller 110 is particularly useful for simulating the rise and fall of tide in the aquarium 50. The tidal level controller 110 generally is made up of a tidal reservoir 120, transfer means 130 for transferring fluid from the tank 56 to the tidal reservoir 120, regulating means 140 for regulating the flow of the fluid in the transfer means 130, adjustment means 150 for adjusting the amplitude of the level displacement between high and low tides and return means 160 for returning the fluid from the tidal reservoir 120 to the tank/ vessel 56.

The transfer means 130 includes a conduit/flexible tube 133 which has an outflow end 132 and an inflow end 134. The outflow end 132 is connected to the diagonal wall 122 of the tidal reservoir 120 which is contiguous to the tank 56 so that fluid may flow out of the outflow end 132 and into the reservoir 120. A portion of the tidal reservoir 120 is positioned below the surface 58 of the fluid 59 in the vessel/tank 56. The inflow end 134 of the transfer means 130 is positioned within the tank 56. The intake end 134 of the tube 130 may have a strainer 138 positioned upon it to minimize the amount of material which flows into the tube 130. The position of the inflow end 134 in the tank 56 will determine the level of the fluid surface 58 within the tank 56. As discussed more fully below, by cyclically raising or lowering the inflow end 134 the surface 58 of the fluid in the tank or vessel 56 will be correspondingly raised or lowered thereby simulating tide.

The return means 160 includes a pump intake 162 and a pump intake conduit 164 which is connected to the third conduits 66 discussed in the previous preferred embodiment. The pump intake 162 is positioned to always be beneath the lowest level of the fluid 158 in the reservoir 120. As discussed above with regard to the other preferred embodiment, fluid is taken up through the conduit 66 and into the algal turf scrubber 20. The turf scrubber 20 and several other components discussed earlier with regard to the earlier preferred embodiment are not included in FIG. 9 for clarity. The fluid is returned to the tank 56 through the second conduit 76 as discussed in the earlier embodiment.

The regulating means 140 includes timers 144 which are connected to a slow synchronous motor 141 which turns a rotating arm 142. The timers 144 engage the motor 141 and determine for what period of time the motor 141 should be engaged. The motor 141 rotates the arm 142 at a periodic cycle such as a complete rotation each approximately 12 hours. The connector 136 pivotally connects the arm 142 to the tube 133. The connector 136 has an arm end 137 and a conduit end 139. The conduit end 139 of the connector 136 is pivotally connected to the tube 130 by the pivot 131.

The connector 136 is adjustably connected to the arm 142 by adjustment means 150. The adjustment means 150 includes a slot 152 disposed along a portion of the length of the arm 142 and a bolt 154 connected to the arm end 137 of the connector 136. The operator may loosen the bolt 154 and slide the connector 136 along the slot 152 and re-tighten the bolt 154 thereby adjusting the distance of the inflow end 134 of the tube 130 to the center of rotation of the arm 142. This enables the operator to adjust the amplitude of the stroke of the inflow end 134 of the tube 130 by the arm 142 and thereby adjust the amplitude of the tidal stroke or displacement of the surface 58 in the tank 56.

The pipe 130, pivot 131, connector 136, arm 142, bolt 154 and conduit 164 are preferably made of plastic.

Having described the structure of the tidal level controller, its operation is described as follows. FIG. 9 shows the arm 142 being rotated in the direction G. As the arm 142 rotates in the direction G the intake end 134 of the tube 130 is pivoted in the direction H as shown in FIG. 9.

As the intake end 134 is pivoted in the direction H it eventually rises above the surface 58 of the fluid in the tank 56. During this time, fluid 59 is being taken from the reservoir 120 through the pump intake 162 and pump intake conduit 164. The fluid 59 enters the conduits 66 and is discharged eventually through the conduit 76 as discussed with regard to the alternate embodiment. Because the intake end 134 is above the surface 58 of the tank 56, no fluid is entering into the reservoir 120. At this time, fluid from the tank 56 is transferred to the reservoir 120 at a lesser rate than it enters the tank 56 through the conduit 76. Accordingly, the surface 158 of the reservoir 120 lowers while the surface 58 of the tank 56 rises. When the surface 58 rises to the level of the intake 134, fluid again enters the reservoir 120. Thus, as the end 134 is pivoted in the direction H, the level 58 of the tank 56 rises in a corresponding manner. By setting the timer 144, this may be made to simulate the gradual rise of the tide. Once the arm 142 and the intake end 134 reach their apex, the end 134 starts to descend down in the direction opposite of the pivot direction H shown in FIG. 9. At this time, fluid 59 leaves the tank 56 through the tube 130 at a greater rate than it enters the tank 56 through the conduit 76. Accordingly, the level 58 is lowered while the level 158 in the reservoir 120 is raised. Thus, the lowering of the level 58 may be made to simulate the lowering of the tide. By adjusting the speed of the rotation of the arm 142, a tidal cycle may be set by the operator.

The total height displacement through the tide cycle may be adjusted by the operator through the adjustment means 150 to simulate, for example, monthly or bi-weekly changes in total tidal amplitudes. By loosening the bolt 154, sliding the connector 136 along the slot 152 in the arm 142 and re-tightening the bolt 154, the operator may adjust the amplitude of the displacement of the fluid level 58 from the high tide and low tide positions. The highest level may be designated the spring high tide water level shown as letter C in FIG. 9, while the lowest level may be described as the spring low tide water level shown as letter D in FIG. 9. Also, an intermediate high tide level such as a neap high tide water level may be set by the operator and is shown as letter E in FIG. 9, while an intermediate low tide level may be achieved such as a neap low tide level shown as level F in FIG. 9. As discussed above, as the level 58 in the tank 56 rises, the level 158 in the reservoir 120 falls and vice versa. Accordingly, FIG. 9 shows the position of the level 158 during the spring high tide as C' and the lowest level of the spring high tide as D'. Also FIG. 9 shows the position of the level 158 during the highest neap tide as E' and the lowest neap tide as F'. Note that even at its lowest level (e.g., the C' position) the level 158 is above the pump intake 162 although the level 158 may be below the outflow end 132 of the flexible tube 133. All pivot lengths by the tube 130 will vary depending upon the height of the tank 56 and the tidal amplitude which the operator is trying to mimic.

The above description and drawings are only illustrative of a preferred embodiment which achieves the objects, features, and advantages of the present invention, and it is not intended that the present invention be limited thereto. Any modifications of the present invention which comes within the spirit and scope of the following claims is considered part of the present invention.

I claim:

1. An algal turf scrubber comprising:
   a moveable surface for growing an algal turf when said surface is in contact with water;
   an algal turf on said surface; and
   moving means for moving said surface to create an oscillatory surge of water across said algal turf when it is in contact with water.

2. The algal turf scrubber of claim 1 further comprising a support structure to which said surface is attached.

3. The algal turf scrubber of claim 2 further comprising artificial light means attached to said support structure and positioned to illuminate said algal turf.

4. An algal turf scrubber comprising:
   a moveable surface for growing an algal turf when said surface is in contact with water;
   an algal turf on said surface;
   moving means for moving said surface to create a surge of water across said algal turf when it is in contact with water;
   a support structure to which said surface is attached; and
   artificial light means attached to said support structure and positioned to illuminate said algal turf; and
   wherein said surface is substantially horizontal.

5. An algal turf scrubber comprising:
   a support structure;
   a moveable surface for growing an attached algal turf when said surface is in contact with water, wherein said surface is pivotally attached to said support structure to pivot about an axis in the same plane as said movable surface; and
   an algal turf on the upper side of said movable surface.

6. The algal turf scrubber of claim 5 wherein said surface is substantially horizontal.

7. The algal turf scrubber of claim 6 wherein said surface is a tray-shaped receptacle.

8. The algal turf scrubber of claim 7 wherein the center of gravity of said receptacle shifts from one side of said axis to the other side when a sufficient amount of water is placed in said receptacle, causing said receptacle to rotate partially about said axis and to dump said water and wherein said center of gravity shifts back across said axis after said water is dumped, returning said receptacle to its original position.

9. The algal turf scrubber of claim 8 wherein the angle of rotation of said receptacle is about 30 degrees.

10. The algal turf scrubber of claim 8 further comprising means for introducing water into said receptacle.

11. The algal turf scrubber of claim 10 further comprising artificial light means positioned above said receptacle.

12. The algal turf scrubber of claim 11 further comprising a screen positioned upon the upper surface of the bottom of said receptacle, wherein said algal turf is attached to said screen.

13. The algal turf scrubber of claim 5 further comprising moving means connected to said surface.

14. A method of removing nutrients and waste from water and adding oxygen to water comprising the steps of:
   providing a growing surface for an algal turf wherein said surface is in contact with said water and said algal turf is on said surface;
   subjecting said surface to light to grow said algal turf on said surface;
   creating an oscillatory water surge motion across said algal turf by moving said surface in a periodic motion; and
   periodically removing a portion of said algal turf.

15. The method of claim 14 wherein said periodic motion of said surface comprises the partial rotation of said surface about an axis through the plane of said surface.

16. A method of removing nutrients and waste from water and adding oxygen to water comprising the steps of:
   providing a growing surface for an algal turf wherein said surface is in contact with said water and said algal turf is on said surface;
   subjecting said surface to light to grow said algal turf on said surface;
   creating a water surge motion across said algal turf by moving said surface in a periodic motion; and
   periodically removing a portion of said algal turf; and
   wherein said periodic motion of said surface comprises motion from side to side substantially within the plane of said surface.

17. A method of removing nutrients and waste from water and adding oxygen to water comprising the steps of:
   providing a growing surface for an algal turf wherein said surface is in contact with said water and said algal turf is on said surface;
   subjecting said surface to light to grow said algal turf on said surface;
   creating a water surge motion across said algal turf by moving said surface in a periodic motion; and
   periodically removing a portion of said algal turf; and
   wherein said periodic motion of said surface comprises a circular oscillatory motion substantially within the plane of said surface.

18. A method of removing nutrients and waste from water and adding oxygen to water comprising the steps of:
   providing a receptacle for growing an attached algal turf when said algal turf is in contact with water, wherein said receptacle is pivotally attached to a support structure to pivot about an axis in the same plane as said receptacle, said receptacle being in contact with said water and wherein said algal turf is on the upper surface of said receptacle;
   subjecting said receptacle to light to grow said algal turf on said surface;
   creating a water surge motion across said algal turf by periodically filling said receptacle with said water and dumping said water from said receptacle by partially rotating said receptacle around said axis and returning said receptacle to its original position; and
   periodically removing a portion of said algal turf growing on said surface.

19. The method of claim 18 wherein the center of gravity of said receptacle first shifts from one side of said axis to the other side when a sufficient amount of water is placed in said receptacle, causing said receptacle to rotate partially about said axis and to dump said water, and said center of gravity then returns to its original position, causing said receptacle to resume its original position.

20. An apparatus for purifying water comprising:
   a support structure;
   a moveable surface for growing an algal turf when said surface is in contact with water, said surface being attached to said support;
   an algal turf attached to said surface;
   moving means for moving said surface to create an oscillatory surge of water across said surface when said surface is in contact with said water, said means being connected to said surface and said support structure; and
   artificial light means attached to said support structure and positioned to illuminate said algal turf.

21. The apparatus of claim 20 further comprising pump means for delivering said water to said surface.

22. An apparatus for purifying water comprising:
   a support structure;
   a receptacle, said receptacle pivotally attached to said support structure to pivot about an axis in the same plane as said receptacle;
   an algal turf attached to said receptacle;
   pump means for delivering said water to said receptacle; and
   artificial light means attached to said support structure and positioned to illuminate said algal turf.

23. The apparatus of claim 22 wherein said receptacle is tray-shaped.

24. The apparatus of claim 22 further comprising moving means connected to said surface.

25. An aquarium comprising:
   a tank for containing water and aquatic specimens;
   a receptacle, said receptacle pivotally attached to a support structure to pivot about an axis in the same plane as said receptacle;
   an algal turf on the upper surface of said receptacle;
   artificial light means positioned to illuminate said algal turf; and
   pump means for moving water from said tank into said receptacle.

26. The aquarium of claim 25 wherein said receptacle is tray-shaped.

27. The aquarium of claim 26 wherein the center of gravity of said receptacle shifts from one side of said axis to the other side when a sufficient amount of water is placed in said receptacle, causing said receptacle to rotate partially about said axis to dump said water, and wherein said center of gravity returns to its original position after said water is dumped, causing said receptacle to return to its original position.

28. The aquarium of claim 27 wherein said pump means creates a periodic water surge motion across the upper surface of said receptacle by filling said receptacle with water from said tank, causing said receptacle to periodically dump said water and return to its original position.

29. The aquarium of claim 28 wherein the dumping motion of said receptacle returns said water to said tank.

30. The aquarium of claim 28 wherein the period of said surge ranges from approximately 5 to 15 seconds.

31. The aquarium of claim 30 wherein the period of said surge is approximately 10 seconds.

32. The aquarium of claim 25 wherein said artificial light means delivers to the surface of said receptacle substantially all of the wavelengths of natural light at an output of about 50% to 100% of natural light.

33. The aquarium of claim 25 wherein said artificial light means delivers approximately 300 to 1200 microeinsteins per $m^2$ per sec.

34. The aquarium of claim 25 wherein said pump means is a lift pump.

35. The aquarium of claim 25 further comprising one or more elements selected from the group consisting of a refugium, artificial light means positioned over said tank, means for removing sediment, means for controlling the salinity of the water, means for controlling the pH of the water, means for controlling water temperature, means for creating a current in said tank, and means for introducing food for said aquatic specimens into said tank.

36. The aquarium of claim 25 further comprising artificial light means positioned above said tank, wherein said artificial light means simulates the transition in intensity of light from dawn to dusk and vice-versa.

37. The aquarium of claim 36 wherein said light means comprises a set of lights and a timer that turns the set of lights on or off, one at a time, in a predetermined sequence.

38. The aquarium of claim 25 further comprising pH control means.

39. The aquarium of claim 38 wherein said pH control means comprises pump means in fluid connection with said tank, a water reservoir, and an acid reservoir, wherein said pump means pumps said water and said acid from said reservoirs at a predetermined ratio to said tank to achieve the desired pH in said water in said tank.

40. The aquarium of claim 39 wherein said acid reservoir comprises an approximately 15 to 1 molar ratio of nitrogen in nitric acid to phosphorous in phosphoric acid.

41. The aquarium of claim 38 wherein said ph control means comprises a container means in gaseous contact with said tank, and said container means containing gaseous carbon dioxide, wherein said container means transfer said gaseous carbon dioxide from said container to said tank at a predetermined rate.

42. The aquarium of claim 41 wherein said container means includes a pressurized bottle.

43. The aquarium of claim 25 further comprising a fluid level controller, said fluid level controller comprising:
- a vessel holding fluid;
- a reservoir capable of holding fluid with transfer means for transferring said fluid from said vessel and to said reservoir;
- regulating means for regulating the flow of fluid through said transfer means; and
- return means for returning said fluid to said vessel.

* * * * *